United States Patent
Hamasaki

[11] Patent Number: 5,867,740
[45] Date of Patent: Feb. 2, 1999

[54] CAM MECHANISM FOR LENS BARREL

[75] Inventor: Takuji Hamasaki, Tsurugashima, Japan

[73] Assignee: Asahi Kogaku Kogyo Kabushiki Kaisha, Tokyo, Japan

[21] Appl. No.: 885,364

[22] Filed: May 19, 1992

[30]     Foreign Application Priority Data

May 20, 1991  [JP]  Japan .................................. 3-214848

[51] Int. Cl.⁶ .................................................. G03B 13/00
[52] U.S. Cl. ........................... 396/144; 396/439; 359/700
[58] Field of Search ................................. 354/195.1, 286; 359/700, 701, 826

[56]            References Cited

U.S. PATENT DOCUMENTS

| | | | |
|---|---|---|---|
| 3,628,439 | 12/1971 | Furusawa | 354/195.1 |
| 3,787,108 | 1/1974 | Ito et al. | 354/195.1 |
| 3,819,254 | 6/1974 | Hummel et al. | 359/826 |
| 4,294,526 | 10/1981 | Nakagawa | 354/195.1 |
| 4,515,438 | 5/1985 | Ohnuki | 359/826 |
| 4,627,691 | 12/1986 | Tomori . | |
| 4,709,311 | 11/1987 | Bornhorst | 359/826 |
| 4,974,949 | 12/1990 | Tanaka . | |
| 5,043,752 | 8/1991 | Kohmoto . | |

*Primary Examiner*—David M. Gray
*Attorney, Agent, or Firm*—Greenblum & Bernstein, P.L.C.

[57]            ABSTRACT

The present invention relates to a cam mechanism for a lens barrel wherein the mechanism is provided with a cam ring and a movable annular member. The cam ring is typically provided with a plural number of cam grooves formed in a predetermined cam profile in the same shape, in the same positions, and in the circumferential direction, but in respective positions differentiated in the optical axis direction. The movable annular member is set in engagement with the cam ring and has a plural number of cam pins installed thereon. The cam pins are fitted into the cam grooves of the cam ring so as to permit the movable annular member to, move freely in the optical axial direction, without being liable to any slanting thereof, in its rotation centering around the optical axis.

20 Claims, 3 Drawing Sheets

CAM MECHANISM FOR LENS BARREL

BACKGROUND OF THE INVENTION

The present invention relates to a cam mechanism for a lens barrel and more particularly to a cam mechanism for a lens barrel, wherein the cam mechanism prevents the slant of a movable annular member set in a cam ring.

Generally, a lens barrel is provided with various types of cam mechanisms for such purposes as zooming and focusing. This cam mechanism basically includes a cam ring with a cam groove formed therein, and a movable annular member (for example, a lens frame) set inside the inner circumference or outer circumference of this cam ring in such a manner as to permit its free rotating movement. The cam mechanism further includes a cam pin fitted into the cam groove formed in the cam ring. In a conventional lens barrel, which is constructed in this manner, the movable annular member will be moved in accordance with the profile of the cam groove, for example, by the rotation of the cam ring.

In this regard, it is preferable to achieve a maximum restraint possible on the slant (i.e. displacement of the axial line) of the movable annular member in relation to the cam ring in this cam mechanism. However, between this cam ring and the movable annular member, there is a relationship of fit provided in order to permit a relative movement between the cam groove and the cam pin, with a gap necessarily formed between these two. Thus, it has been found that the conventional cam mechanism for a lens barrel has the disadvantage that the movable annular member is liable to slant in a particular direction in relation to the cam ring because of the presence of such a gap.

With reference to FIG. 1 and FIG. 2, a description will be given below in respect to the direction in which the slant, mentioned above, occurs and the reason for its occurrence in the cam mechanism in the conventional construction.

As shown in FIG. 1, a movable annular member 12 is fitted into the inside of the inner circumference of a cam ring in such a manner as to permit its free rotating motion in the same axial line as that of the rotating motion of the cam ring 11. Also, the cam ring 11 has a cam groove 13 formed in each of two locations opposite to each other in the radius direction in the state of its penetration in the thickness direction, as illustrated in FIG. 2. In the meanwhile, cam pins 14, which are to be set respectively in the cam grooves 13, are set in the surface on the outer circumference of the movable annular member 12.

In this conventional construction, a segment Q, of a line connecting the centers of the pair of cam pins 14, is defined as the axial line of rotation crossing the optical axis O at right angles. It is thereby made possible for the movable annular member 12 to be moved, in its rotation centering around this axial line Q of rotation, in relation to the cam ring 11, in correspondence to a clearance c, delimited by the inner circumferential surface of the cam ring 11 and the outer circumferential surface of the movable annular member 12. In consequence of this construction, it is likely that the movable annular member 12 will have a slant more predominantly in the thickness direction of this clearance c. As compared with this, the slant, which occurs in the front group lens frame (not illustrated in the drawings) as the result of its rotation centering around the axis R crossing the axial line Q of rotation at right angles, will not be so much as the slant caused by its rotation centering around the axial line Q of rotation, because the relationship of fit between the cam groove 13 and the cam pin 14 restrains the slant in this case.

Such a slant of the movable annular member has not caused previous problems in a construction wherein the cam ring 11 and the movable annular member 12 respectively, are made of metal material that delivers a high degree of fitting accuracy. However, there has recently been a tendency to use a variety of resin-made annular members, including the cam ring 11 for a lens barrel, due to a reduction of weight and/or a reduction of costs. Such annular members, made of resin, are inferior in fitting accuracy as compared with annular members made of metal material. Hence, a slant of an annular member like the one described above, has come to present a more notable problem. Thus, it is currently desired to resolve this problem.

Moreover, such a slant of the movable annular member 12 for the cam mechanism is in the worst condition when the cam grooves 13 and the cam pins 14 are respectively provided at an interval of 180°, but this may also occur under other conditions.

SUMMARY OF THE INVENTION

The present invention has been made in consideration of the circumstances described above. The object of the present invention is to offer a cam mechanism for a lens barrel wherein the cam mechanism is constructed in such a manner that a movable annular member, fitted into a cam ring, can be prevented from its rotating motion (i.e. slant) centering around a cam pin even when case the annular member for the lens barrel is made of resin.

In order to attain this object by resolving the problem mentioned above, a cam mechanism is formed, for use with a lens barrel. In accordance with one aspect of the present invention, the cam mechanism includes a cam annular member having a first cam groove formed in a predetermined profile thereon, and a movable annular member attached to the cam annular member in such a manner that the movable annular member is permitted to be movable in an optical axis direction. The cam mechanism further includes a first cam pin set in this movable annular member and fitted into the first cam groove, wherein the cam annular member is provided with at least one of a second cam groove formed in a shape identical to that of the first cam groove and in the same circumferential direction, but in positions different in the optical axis direction. The movable annular member is provided further with a second cam pin to be fitted into this second cam groove.

A feature characteristic of the present invention is that the invention has been completed on the basis of the concept that the motion of the movable annular member in rotation around the first cam pin is to be prevented by an engagement of the second cam pin with the second cam groove.

Specifically, the cam mechanism constructed in accordance with the present invention for use with a lens barrel is to be applied to a lens barrel that includes a movable annular member and a cam ring. The movable annular member is fitted into the cam ring, which has at least one cam groove formed thereon, and also has at least one cam pin to be fitted into the cam groove or grooves on the cam ring. The cam mechanism is characterized in that the cam ring has a plural number of cam grooves formed thereon in identical shape and in the same radial direction, but in positions different in the optical axis direction. The movable annular member is provided with a plural number of cam pins to be fitted into the plural number of cam grooves.

In another aspect of the lens barrel according to the present invention, the movable annular member will be prevented from its rotation by the relationship of fit between the other cam pin and the other cam groove even if the movable annular member receives an impetus to rotate centering around one cam pin. Therefore, the cam mechanism is not effected by the occurrence of any slant of the movable annular member in consequence of its rotation centering around the cam pin.

Moreover, such a cam pin is commonly fitted into a guide groove formed in a stationary ring. In another aspect of the lens barrel, according to the present invention, guide pieces, for connecting the cam pins to be fitted into a plural number of cam grooves, are set in a manner permitting their free sliding movement in guide grooves formed on such a stationary ring. With guide pieces set in this manner, the relationship between the guide pieces and the guide grooves will prevent the movable annular member from slanting.

Furthermore, a pursuit of the slant-preventing effect to be achieved with the guide pieces and the guide grooves has revealed that, without forming any plural number of such cam grooves, it is possible to prevent the movable annular member from slanting. That is to say, the cam mechanism, constructed in still another aspect thereof, in accordance with the present invention for use with a lens barrel, is provided with a stationary annular member having a guide groove formed thereon. A cam annular member is positioned on the stationary annular member in such a manner as to permit the cam annular member to be rotatable around an optical axis of the stationary annular member and having a first cam groove formed in a predetermined cam profile thereon. A movable annular member attached to said cam annular member is provided wherein it is in such a manner as to permit the movable annular member to be movable in an optical axis direction. The cam mechanism further includes a first cam pin installed on the movable annular member and fitted into the guide groove of the stationary annular member at the same time as it is fitted into the first cam groove on said cam annular member, and a guide piece installed in a structure unified with the first cam pin and fitted into the guide groove in such a manner that the guide piece can slide freely therein.

In this construction, the cam mechanism can prevent the movable annular member from a slant, using the relationship of fit between the guide piece and the guide groove.

BRIEF DESCRIPTION OF THE DRAWINGS

The manner in which the above-mentioned object, features and advantages of the present invention are attained will be fully evident from the following detailed description when it is considered in light of the drawings, wherein.

DETAILED DESCRIPTION OF PREFERRED EMBODIMENT

Figure 1:
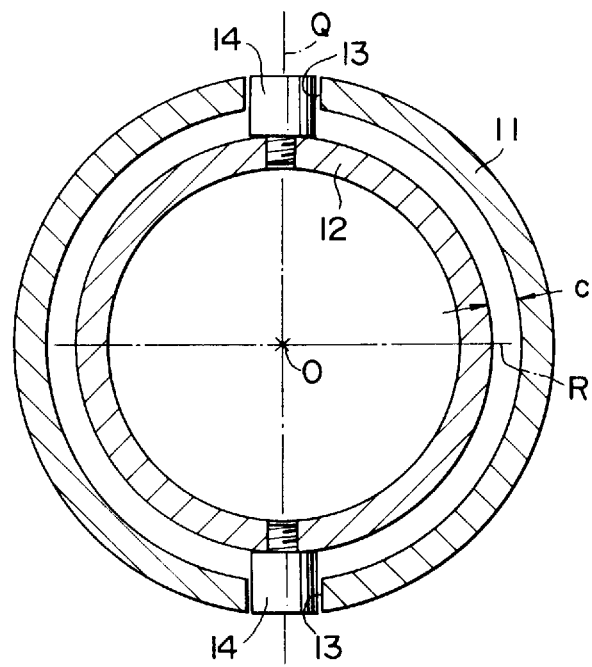
FIG. 1 is a sectional view illustrating the construction of the conventional cam mechanism for a lens barrel.
Figure 2:
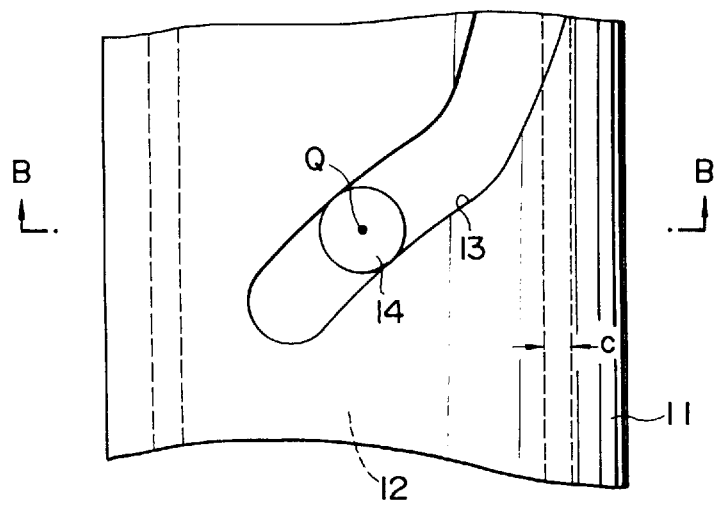
FIG. 2 is a plane view illustrating a plane shape of the cam mechanism in the conventional construction, as shown in FIG. 1.
Figure 3:
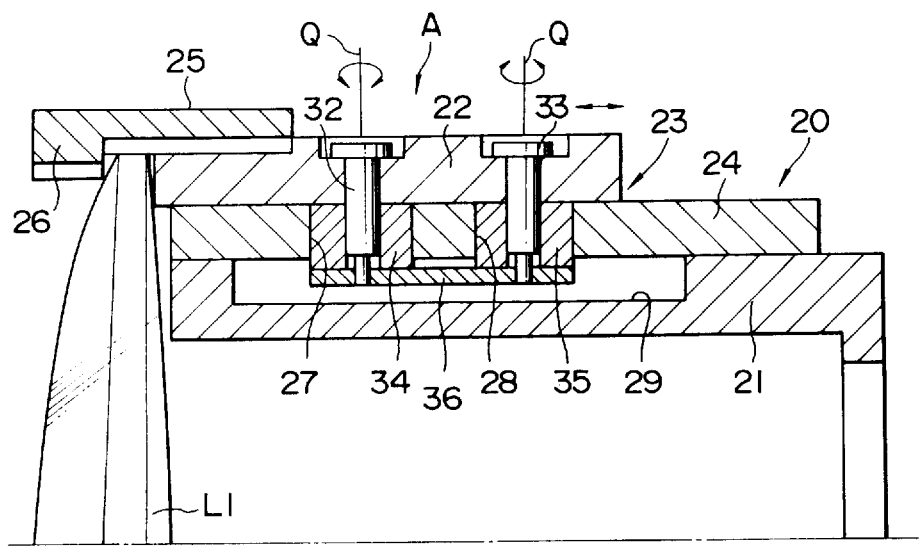
FIG. 3 is a upper-half sectional view illustrating the essential parts of the construction in one example of preferred embodiment of a cam mechanism made in accordance with the present invention for use in a lens barrel.
Figure 4:
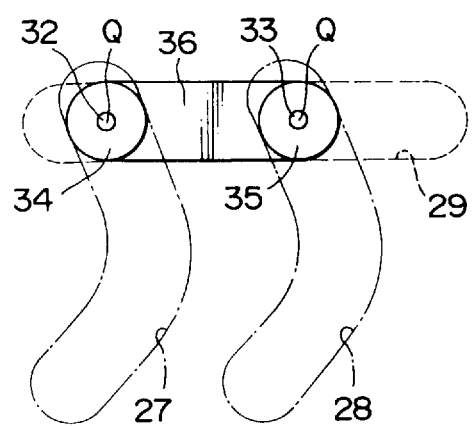
FIG. 4 is an exploded view illustrating the cam groove and the cam pin in the cam mechanism shown in FIG. 3 as exploded on a plane, taking the state of fit of the cam groove and the cam pin as viewed in the direction indicated by the arrow mark.

With reference to FIG. 3 and FIG. 4, a detailed description will be made of the construction of a preferred embodiment of a cam mechanism, according to the present invention, for application to a lens barrel.

First, the lens barrel 20, in a preferred embodiment, is provided with a stationary annular member 21 coaxial with an optical axis of the lens barrel 20, as shown in FIG. 3. On the outer circumference of the stationary annular member 21, a movable annular member 22 is coaxially arranged in such a manner as to permit its movement in an extending direction of the optical axis of the lens barrel 20 (hereinafter, the direction would be simply referred as the optical axis direction). Here, a cam mechanism 23, which constitutes a feature characteristic of the present invention, is interposed between the stationary annular member 21 and the movable annular member 22 in order that the movable annular member 22 may be moved; therewith, in the optical axis direction.

In further detail, the cam mechanism 23 is provided with a cam annular member 24, which is fitted on the outer circumference of the stationary annular member 21 in such a manner that the cam annular member 24 can move freely in its rotation around the optical axis of the lens barrel 20. The cam annular member 24 is driven either by manual operation or by electrical operation in a state prohibited from its movement in the optical axis direction, i.e., in a position where it is fixed in respect of the optical axis direction, or in such a manner as to make it possible for the cam annular member 24 to move in the optical axis direction by the effect of a helicoid coupling.

A front group lens frame, defined as the movable annular member 22, is set in the outer circumference of the cam annular member 24 in such a manner as to permit the movable annular member 24 to be set into free movement in the optical axis direction. A lens clamping frame 25 is set on the outer circumference of the top end of the front group lens frame 22 in a manner permitting the lens clamping frame 25 to move in the optical axial direction concentric therewith. A flange part 26, for engagement, is formed in a unified structure on the inner circumference at the top end of the lens clamping frame 25. The front lens group L1 is held between the rear end surface of the flange part 26 of the lens clamping frame and the front end surface of the front group lens frame 25.

On the cam annular member 24, two cam grooves, namely, a first cam groove 27 and a second cam groove 28, both identical in shape, are formed in a state in which these cam grooves 27 and 28 are in positions in the same circumferential direction, but in mutually different positions in the optical axis direction. In addition, straight-movement guide grooves 29, in parallel with the optical axis, are formed in the stationary annular member 21 in a state in which they are in their correspondence with the positions where the first cam groove 27 and the second cam groove 28 are arranged.

Moreover, a first cam pin shaft 32 and a second cam pin shaft 33 are set inwards in the radius direction in the front group lens frame 22 in the state in which these cam pin shafts 32 and 33 respectively, penetrate through the first and second cam grooves 27 and 28. These first and second cam pin shafts 32 and 33 are provided with a first cam pin (roller) 34 and a second cam pin (roller) 35, which are respectively formed in a round sectional shape and are to be set in the respectively corresponding first and second cam grooves 27 and 28 in such a manner as to permit the cam pins (rollers) 34 and 35 to roll freely.

The distal end parts (i.e. end parts inwards in the radius direction) of the first and second cam pin shafts 32 and 33 extend into the inside area of the straight-movement guide groove 29 and their distal end parts are fixed on both end parts of the guide piece 36. The guide piece 36 is formed into a non-circular member having a width corresponding to the width of the straight-movement guide groove 29 and is regulated in such a way that it moves only in the extending direction of the straight-movement guide groove 29, i.e., the optical axis direction, not rotating inside the straight-movement guide groove 29.

Furthermore, as it is evident from the description 20 given above, the first and second cam pins (rollers) 34 and 35 will be driven for their rotation around the axial line Q of rotation, crossing the optical axis at right angles.

As the cam mechanism 23, in the single example of preferred embodiment, is constructed in the manner described in detail in the foregoing part, the front lens group frame 22 is driven forward and backward along a line in the direction of the optical axis in accordance with the cam profiles of the first and second cam grooves 27 and 28 when the annular cam member 24 is rotated. As the result of the operation, zooming or focusing will be performed. Moreover, even if the front lens group frame 22 has an impetus to move in rotation, centering around the respective axial lines Q of rotation for the first and second cam pin shafts 32 and 33, namely, the first and second cam pins (rollers) 34 and 35, on the occasion of these forward and backward driven movements, such a rotation of the front group lens frame 22 will be prevented by the relationship of fit between the first cam pin (roller) 34 and the first cam groove 27, and the relationship of fit between the second cam pin (roller) 35 and a second cam groove 29.

In addition, the relationship of fit between the guide piece 36 and the straight-movement guide groove 29 is useful for preventing the front group lens frame 22 from its rotating motion centering around the axis Q.

The present invention is not limited to the construction described in the single example of its preferred embodiment given above, but can be modified in various ways so long as such a modification does not deviate from its essential technical scope as defined hereinbelow.

Figure 5:
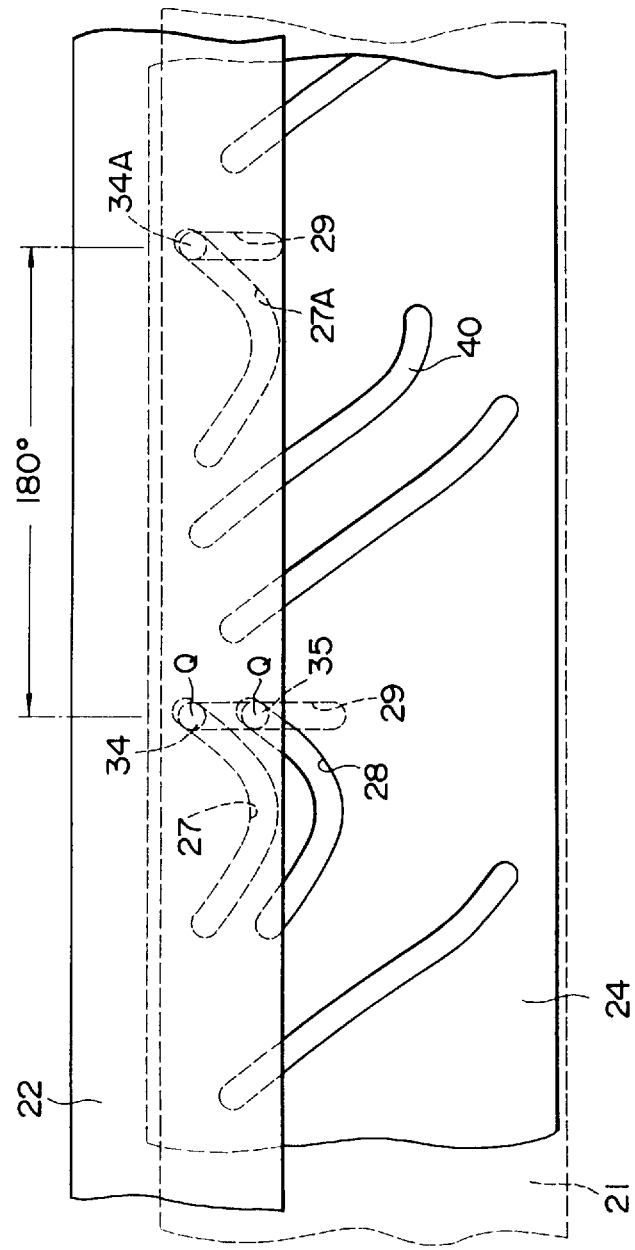
FIG. 5 is an exploded view illustrating the construction of a second example of preferred embodiment of the cam mechanism, formed in accordance with the present invention, for use in a lens barrel, presenting the cam mechanism in the same state, as shown in FIG. 4.

For example, the first and second cam grooves 27 and 28, in a preferred embodiment given above, have been described to the effect that they are formed in such a state that they are in the same position in the circumferential direction but in positions different from each other in the direction of the optical axis. The present invention is not to be limited to this manner of construction, but may be constructed, for example, in the manner shown in a second preferred embodiment, as shown in FIG. 5. Specifically, in the second preferred embodiment, the cam mechanism, according to the present invention, is constructed in such a manner that a third cam groove 27A is formed, in addition to the first and second cam grooves 27 and 28, in a circumferential position differentiated by just 180° from the first cam groove 27 but in the same shape and in the same position in the direction of the optical axis. Then, the cam mechanism is constructed in such a way that a third cam pin 34A, which is supported with the front group lens frame 22, is fitted into engagement with the third cam groove 27A.

Also, in the example of preferred embodiment given above, it is described that the first and second cam pin shafts 32 and 33 are connected with each other by the guide piece 36. In the second preferred embodiment, as shown in the FIG. 5, the guide piece 36 is not provided. Thus, the second preferred embodiment, as shown in FIG. 5, does not have any guide piece 36, but will prevent the front lens group frame 22 from rotating, centered around the axis Q of the front group lens frame 22, by the engagement of the first cam pin (roller) 34 with the first cam groove 27 and by the engagement of the second cam pin (roller) 34 with the second cam groove 28, respectively.

Also, in the second preferred embodiment, as shown in the FIG. 5, another cam groove 40 is formed in an extended state to a part differentiated in the circumferential direction just by 180° from the second cam groove 28. In order to avoid interferences with the other cam groove 40, a fourth cam groove (not shown) is not formed in the state of its differentiation just by 180° in its position in the circumferential direction. However, provided that it is possible to avoid its interference with the other cam groove 40, a fourth cam groove may be provided in the same shape as the second cam groove 28 and accordingly in the same shape as the third cam groove 27A. The second cam groove 28 may be provided in a position differentiated in the direction of the optical axis in a state where the third cam groove 27A is in a position differentiated just by 180° in the circumferential direction from the second cam groove 28.

Moreover, one of the first and second cam grooves 27 and 28, which may, for example, be the second cam groove 28, can be eliminated from the example of preferred embodiment given above. In which case the front group lens frame 22 can similarly be prevented from its slanting, centering around the axis Q, by fixing the guide piece 36, with the first cam pin shaft 32 of the first cam pin (roller) 34 set in the first cam groove 27, being secured to prevent it from rotation. The guide piece 36 is then fitted into the straight-movement guide groove 26 in such a manner as to permit the guide piece 36 to slide freely therein.

Furthermore, it is described in one of the examples of preferred embodiments that the movable annular member 22 is to be arranged on the outer circumference of the stationary annular member 21, but the present invention is not to be limited to such a construction like this. The present invention is effectively applicable to a case in which a movable annular member 22' is arranged on the inner circumference of the stationary annular member 21.

As described in detail above, the cam mechanism according to the present invention, for use in a lens barrel, is capable of effectively preventing the movable annular member from slanting due to a rotating motion centering around the cam pin. Also, in addition to the effect of preventing the movable annular member from slanting by incorporating a plural number of cam grooves and a plural number of cam pins formed in the same shape, respectively, the present invention makes it possible to prevent the movable annular member also by the relationship of fit between the guide groove and the guide piece. Further, the present invention can prevent the movable annular member from slanting by the effect of the relationship between the guide groove and the guide piece without providing any plural number of cam grooves in an identical shape.

The present application relates to subject matters contained in Japanese Patent Application No. HEI 3-214848 filed on May 20, 1991, which is expressly incorporated herein by reference in its entirety.

What is claimed is:

1. A cam mechanism for a lens barrel, said cam mechanism comprising:

an annular cam member having a first cam groove having a predetermined arcuate profile:

a movable annular member attached to said annular cam member in such a manner as to permit said movable annular member to be movable in an optical axis direction; and a first cam pin installed on said movable annular member and fitted into said first cam groove of said annular cam member, and wherein,
said annular cam member has at least one second cam groove formed thereon and having a predetermined arcuate profile in a same shape as said arcuate profile of said first cam groove said second cam groove positioned circumferentially aligned with said first cam groove and offset from said first cam groove in the optical axis direction, and said movable annular member is provided with a second cam pin to be fitted into said second cam groove.

2. The cam mechanism according to claim 1, which further comprises:

a stationary annular member provided in a fixed position and having guide groove, into which said first and second cam pins are received.

3. The cam mechanism according to claim 2, which further comprises:

a guide piece fitted into said guide groove in said stationary annular member in such manner as to permit said guide piece to slide freely therein, and said guide piece provided with a first cam pin and a second cam pin respectively fitted into said first and second cam grooves.

4. The cam mechanism according to claim 3, wherein said guide groove extends in the optical axis direction, and said guide piece is fitted into said guide groove in such a manner as to permit said guide piece to slide freely in an extending direction of the guide groove.

5. The cam mechanism according to claim 3, wherein said guide piece is formed in a non-circular sectional shape which permits said guide piece to be fitted into said guide groove in such a manner as to permit said guide piece to slide freely therein.

6. The cam mechanism according to claim 2, wherein said movable annular member is arranged on an outer circumference of said annular cam member.

7. The cam mechanism according to claim 6, wherein said annular cam member is arranged on an outer circumference of said stationary annular member.

8. The cam mechanism according claim 1, wherein said annular cam member has at least a third cam groove in a same shape as said first cam groove, and in a same position in the optical axis direction, but in a position differentiated in the circumferential direction.

9. The cam mechanism according to claim 8, wherein said third cam groove is formed in a position displaced by just 180° in the circumferential direction from the first cam groove.

10. The cam mechanism according to claim 8, wherein said cam annular member has at least a fourth cam groove formed in a same shape as said third cam groove in a same position in the circumferential direction, but in a position differentiated in the optical axis direction.

11. The cam mechanism according to claim 10, wherein said fourth cam groove is formed in a same position on said optical axis as the second cam groove.

12. A cam mechanism for a lens barrel, said cam mechanism comprising:

a stationary annular member having a guide groove formed thereon;

an annular cam member arranged on said stationary annular member in such a manner as to permit said annular cam member to be rotatable around an optical axis of said stationary annular member and having a first cam groove formed in a predetermined cam profile thereon;

a movable annular member attached to said annular cam member in such a manner as to permit said movable annular member to be movable in an optical axis direction;

a first cam pin installed on said movable annular member and fitted into said cam groove of said stationary annular member at a same time as said first cam pin is fitted into said first cam groove on said annular cam member, and a guide piece installed in a structure unified with said first cam pin and fitted into said guide groove in such a manner that said guide piece can slide freely therein;

wherein said annular cam member is provided with at least one second cam groove formed thereon and having a same shape as said first cam groove said second cam groove being positioned circumferentially aligned with said first cam groove and offset from said first cam groove in the optical axis direction, and said movable annular member is provided with a second cam pin to be fitted into said second groove.

13. A cam mechanism according to claim 12, wherein said guide groove accepts said first cam pin and said second cam pin.

14. The cam mechanism according to claim 13, wherein said guide groove extends in the optical axis direction, and said guide piece is fitted into said guide groove in such a manner that said guide piece can slide freely in an extending direction of said guide groove.

15. The cam mechanism according to claim 12, wherein said guide piece is formed in a non-circular sectional shape permitting said guide piece to be fitted into said guide groove in such a manner as to permit said guide piece to slide freely therein.

16. The cam mechanism according to claim 12, wherein said annular cam member is provided with at least one third cam groove formed thereon in a same shape as said first cam groove and in a same position in the optical axis direction, but in a position differentiated in the circumferential direction.

17. The cam mechanism according to claim 16, wherein said third cam groove is formed in a position displaced 180 degrees in the circumferential direction from said first cam groove.

18. The cam mechanism according to claim 17, wherein said annular cam member is provided with at least one fourth cam groove formed in a same shape as said third cam groove in a same position in the circumferential directions but in a position differentiated in the optical axis direction.

19. The cam mechanism according to claim 18, wherein said fourth cam groove is formed in a same position on the optical axis as said second cam groove.

20. A cam mechanism for a lens barrel, said cam mechanism comprising:

an annular cam member having at least two arcuate cam grooves formed thereon with a same profile, said two arcuate cam grooves positioned circumferentially aligned with each other and offset with respect to each other in an optical axis direction;

a movable annular member movably attached to said annular cam member; and at least two cam pins installed on said movable annular member and fitted into said at least two cam grooves of said annular cam member respectively.

* * * * *

UNITED STATES PATENT AND TRADEMARK OFFICE
CERTIFICATE OF CORRECTION

PATENT NO. : 5,867,740
DATED : February 2, 1999
INVENTOR(S) : T. HAMASAKI

It is certified that error appears in the above-indentified patent and that said Letters Patent is hereby corrected as shown below:

At column 7, line 47 (claim 9, line 3) of the printed patent, "the" should be ---said---. (2nd occurrence)

At column 8, line 15 (claim 12, line 25) of the printed patent, after "groove" insert ---,---.

At column 8, line 49 (claim 18, line 5) of the printed patent, "directions" should be ---direction,---.

Signed and Sealed this

Eleventh Day of April, 2000

Attest:

Q. TODD DICKINSON

*Attesting Officer*  *Director of Patents and Trademarks*